Aug. 1, 1950  F. P. JENKIN  2,517,319
PLUG GAUGE
Filed July 6, 1948

Inventor
Fred P. Jenkin
By
Attorneys

Patented Aug. 1, 1950

2,517,319

UNITED STATES PATENT OFFICE 2,517,319

PLUG GAUGE

Fred P. Jenkin, Ilion, N. Y.

Application July 6, 1948, Serial No. 37,230

3 Claims. (Cl. 33—178)

This invention relates to an improvement in plug gages.

In any plug gage, most of the wear occurs at the end. When this end wear reaches a chosen limit the gage must be discarded. In gages for shallow holes or holes in thin stock, the waste incurred by discarding the gages could be cut down by reducing the axial length of the gaging section, except for the fact that in making a plug gage and lapping it to proper size, it is desirable to have a substantial axial length.

According to the invention, a gage is made having a sufficient aggregate axial length to permit accurate lapping and having the gaging section made up of a plurality of disc-like sections separated by grooves. The end discs may be successively removed and discarded as each becomes worn. Manufacturing expense is thus kept to a minimum, while manufacturing accuracy is not impaired by having a short axial section.

A plug gage embodying the invention is shown in the accompanying drawing in which.

Figure 1:
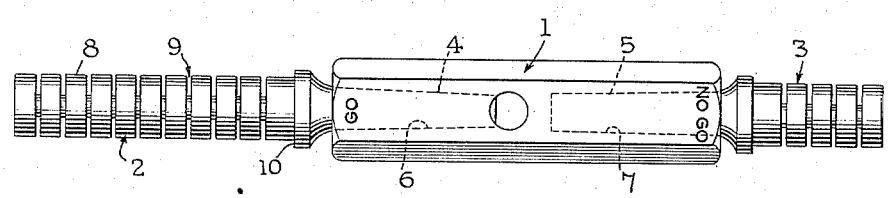
Fig. 1 is an elevation of the gage.

The gage is shown as a conventional "go-no go" type. A handle 1 carries the two plugs, plug 2 being the "go" gage and plug 3 being the "no go" gage. The gage sections are shown removable from the handle 1 and provided with tapered shanks 4 and 5 which are pressed into the tapered sockets 6 and 7 in the handle. Since the plug sections 2 and 3 are identical except for differences in dimension, only one will be described in detail. The plug section 2 is subdivided into a plurality of spaced disc-like gage units 8 by a series of rather deep circumferential cuts 9. The cuts may be graduated as to depth, i. e. successive cuts counted from the end may be made slightly shallower, but the differential should be slight and is hardly visible in the drawing. The purpose is to make the end core the most readily frangible.

The plug section 2 is provided at its inner end with a shoulder 10 which affords purchase for a press used in pressing the shank 4 into the socket 6.

Figure 2:
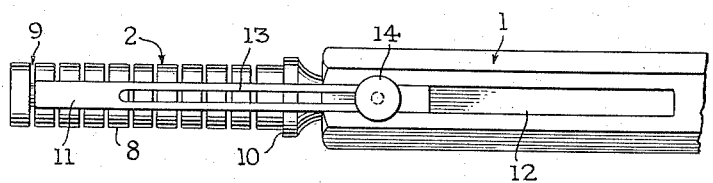
Fig. 2 is an elevation of a modified form of the gage.

As shown in Fig. 2, the handle 1 is provided with a slidable member 11 which is carried in groove 12 in the handle. The member 11 has an elongated slot 13 through which a clamp screw 14 passes, and acts as a stop for the "go" gage. Since entrance of the "no go" gage is infrequent, a stop for it is not considered necessary.

In practice the gage sections are machined to their rough dimensions and the circumferential cuts are then made. The gage is then heat treated to give it the desired hardness. After hardening, the gage is first rough ground, then fine ground to a size closely approaching their final dimensions. The gages are then lapped over their entire axial extent to their final desired dimensions.

It will be seen that as successive end discs 15 becomes worn they can be removed and discarded. This may be accomplished either by cutting the slender core at the bottom of the grooves with a thin rubber wheel or by striking the section a sharp blow with a hammer. If the latter method is used, care should be taken to support the gaging body so that it will not be damaged.

I claim:

1. A plug gage for gaging holes of limited depth, comprising an integral gaging body having a longitudinal core portion characterized by ready severability, said body being sub-divided by encircling grooves into distinct gage units dimensioned to gage to identical standards of dimension, at least the peripheral surfaces of said units being of a hardness suited for gage use, and the grooves being deep enough to reach to said core portion.

2. A plug gage for gaging round holes of limited depth, comprising an integral cylindrical gaging body having an axial core portion characterized by ready severability, said body being sub-divided by encircling grooves into distinct cylindrical gage units of uniform diameter, at least the cylindrical surfaces of said units being of a hardness suited for gage use, and the grooves being deep enough to reach to said core portion.

3. A plug gage for gaging round holes of limited depths comprising in combination a handle portion; a one-piece cylindrical gaging body attached at one end to said handle portion and having an axial core portion characterized by ready severability, said body being sub-divided by encircling grooves into distinct cylindrical gage units of uniform diameter, at least the cylindrical surfaces of said units being of a hardness suitable for gage use and the grooves being graduated in depth, the groove-depths increasing from the handle end toward the opposite end of the body and each groove being deep enough to reach to said core portion.

FRED P. JENKIN.

REFERENCES CITED

The following references are of record in the file of this patent:

UNITED STATES PATENTS

| Number | Name | Date |
| --- | --- | --- |
| 1,393,233 | Martell | Oct. 11, 1921 |
| 1,435,501 | Runge | Nov. 14, 1922 |
| 1,514,250 | Briney | Nov. 4, 1924 |

FOREIGN PATENTS

| Number | Country | Date |
| --- | --- | --- |
| 5,703 | Great Britain | Oct. 25, 1906 |
| 136,689 | Great Britain | Dec. 24, 1919 |